(No Model.)
E. W. JENKINS.
RUNNING GEAR FOR VEHICLES.
No. 400,772. Patented Apr. 2, 1889.
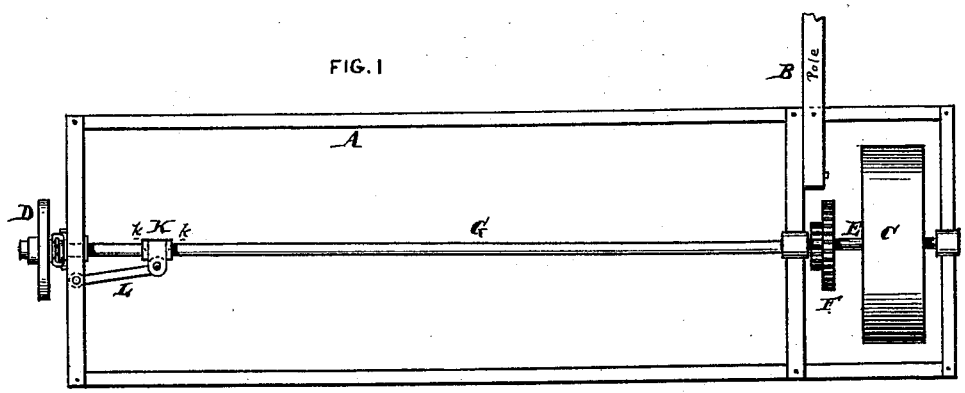
FIG. 1
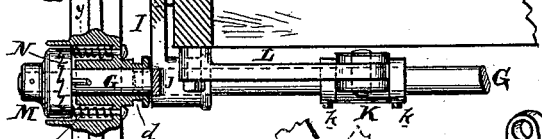
FIG. 2
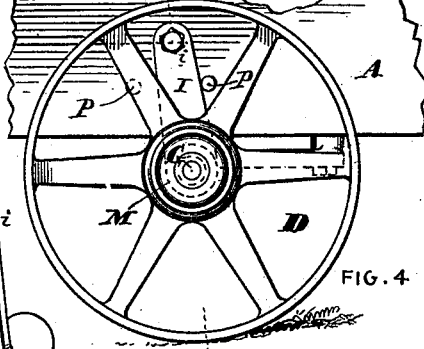
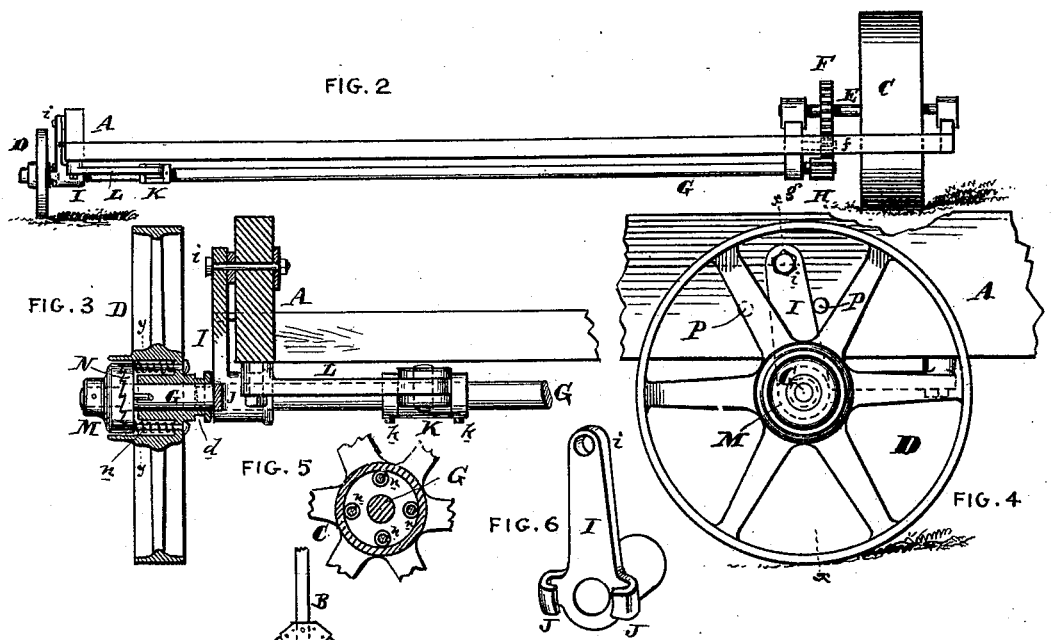
FIG. 3
FIG. 5
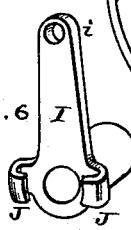
FIG. 6
FIG. 4
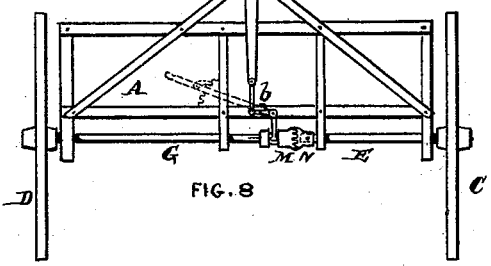
FIG. 8
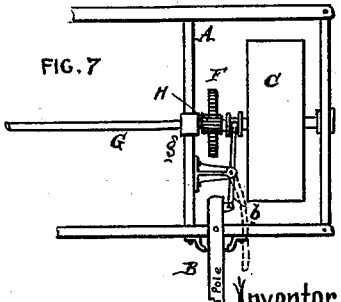
FIG. 7
Attest
Howard A. Hert
E. M. Breckinredy
Inventor.
Edward W. Jenkins
By his atty

UNITED STATES PATENT OFFICE.

EDWARD W. JENKINS, OF NORRISTOWN, PENNSYLVANIA.

RUNNING-GEAR FOR VEHICLES.

SPECIFICATION forming part of Letters Patent No. 400,772, dated April 2, 1889.

Application filed April 12, 1886. Serial No. 198,584. (No model.)

*To all whom it may concern:*

Be it known that I, EDWARD W. JENKINS, of Norristown, county of Montgomery, and State of Pennsylvania, have invented an Improvement in Compensating Running-Gear of Vehicle-Wheels, of which the following is a specification.

My invention has reference to the running-gear of vehicles, and is especially adapted to agricultural machines; and it consists in certain improvements, all of which are fully set forth in the following specification and shown in the accompanying drawings, which form part thereof.
Side draft and irregular side action to teams while driving agricultural machines, caused by one or both wheels being placed at wide gage or unequally located with reference to the pole or by unequal balancing of the machine, is one of the great disadvantages incident to harvesting and other agricultural machines and necessarily limits the gage or breadth of cut in reapers, mowers, and self-binders.
The object of this invention is to prevent side action and draft to the team when hitched or connected to a machine, which as now constructed would have great tendency to the side-draft action. In addition to the purely side-draft action there is a defect due to irregular running of the machine and consequent lateral swinging of the pole, and this is necessarily injurious to the horses and at the same time most tiring. My object is also, therefore, to overcome this tendency of jerking and pitching the horses by broad-gage machines. It is self-evident that a machine which overcomes these defects can be made much wider and thereby accomplish more work with the same labor and will be less tiring and wearing upon the driver and horses, and in addition to this will increase its life and accomplish its work in a more steady and uniform manner. The master or drive wheel with a constant and uniform pull by the horses will assume a substantially uniform velocity on rough ground, thereby insuring a better movement to the various working parts, which in a self-binding harvester are very numerous.

The essential feature of this invention is in the clutching of the two wheels, (in a harvester the drive or master wheel and grain-wheel,) whereby they revolve together with equal surface velocities when performing work, but shall be automatically disconnected by the action of the machine when turning a corner or curve, so that they may revolve at different velocities. By this means the grain side of a harvester is caused to travel over the ground with an equal speed with a stubble side, and, if desired, a slight increased surface velocity may be given to the grain-wheel by slight variation in the diameters of the connecting-gearing to overcome the great duty of the cutter-bar, which has a constantly-retarding tendency to the forward movement of the machine and is necessarily located to the grain side of the pole.

In the drawings, Figure 1 is a plan view of a harvesting-machine frame, showing my improvement attached thereto. Fig. 2 is a rear elevation of same. Fig. 3 is a sectional elevation on line $x$ $x$, Fig. 4, showing the clutch device and the grain-wheel. Fig. 4 is a side elevation looking onto the grain-wheel. Fig. 5 is a sectional elevation through the grain-wheel slot and its shaft on line $y$ $y$, Fig. 3. Fig. 6 is a perspective view of the swinging grain-wheel journal. Fig. 7 is an inverted plan view of a modified arrangement for shifting the clutch automatically upon turning corners; and Fig. 8 is a plan view of an agricultural machine-frame especially adapted to grain-drills, fertilizers, and rakers.

A is the frame of the machine, and may be of any shape or construction desired.

B is the pole.

C is the master or drive wheel, and is secured to a shaft, E, furnished with a spur-wheel, F.

D is the grain-wheel, and is secured upon a shaft, G, by a suitable device, which shaft is supported in a fixed bearing, $g$, and a swinging bearing, I, pivoted at $i$ to the frame of the machine, the shaft being provided with a pinion, H, which gears with the spur-wheel F through the mediation of a spur-wheel, $f$. This spur-wheel $f$ is simply an intermediate gear suitably located to mesh with both the spur-wheel F and pinion H, whereby both the shaft E and shaft G and their wheels C and D shall rotate in the same direction. The relative diameters of the gear-wheels F and H are such that the surface speeds of the master-wheel C and grain-wheel D are substantially the same, or preferably the grain-wheel should have slightly greater surface velocity. From this it is seen that a pull upon the pole will transmit the impulse directly to the machine close to the side next to the grain-wheel to the same extent as to the side next to the master-wheel, and this will cause the machine to travel uniformly without side draft or excessive jarring or lateral vibration of the pole. The grain-wheel is connected to the shaft G by means of a clutch-disk, N, connected to it by a spring device, $n$, consisting of studs and springs, and said disk clutches with the head M, secured to the shaft G.

The clutch is made as follows: The hub of the grain-wheel is made hollow, as shown in Figs. 3 and 5, in which a clutch-disk, N, having saw or ratchet teeth, is placed and connected to said hub by rods, around which are placed springs, as shown at $n$. These parts are so arranged that the springs tend to push the clutch N out of the hub and against the clutch M, secured upon the end of the shaft G, upon which the grain-wheel is journaled. Normally this construction allows the grain-wheel to turn freely backward, but is caused to rotate with the forward rotation of the shaft G. The clutch is so formed that it allows the grain-wheel to freely rotate upon its axis, allowing the machine to move forward faster at the grain side than at the stubble side, but so that it shall be rotated forward positively by the rotation of the shaft G and with a uniform velocity when the machine is normally working.

Referring to Fig. 1, it will be seen that if the grain end of the machine be turned backward upon the master-wheel C as a pivot the grain end of the machine would be thrown backward and the wheel D would be allowed to rotate freely, as the clutch would be thrown out of action, as hereinafter described. If, now, it were desired to turn in the opposite direction, it would be necessary to allow the surface speed of the grain-wheel to greatly increase over that of the master-wheel when its end of the machine is moved over the ground faster than the end corresponding to the master-wheel, and to permit this I provide the spring part N $n$ of the clutch to release the grain-wheel from the shaft G, as hereinafter described. The grain-wheel D is held upon the shaft G by the lugs J on the swinging bearing I, which lugs work in an annular groove, $d$, on the head of the grain-wheel. The swinging bearing has its motion limited by suitable stops, P. (See Fig. 4.) Loosely supported upon the shaft G and kept in a fixed longitudinal position thereon by collars $k$ is a sleeve, K, which is connected by a link, L, with the frame A of the machine, so that in turning the grain end of the machine backward the frame A will tend to move slower than the grain-wheel, as the tendency of the frame A is to move backward and the tendency of the grain-wheel is to move forward or stand still through its connections with the master-wheel, and, through the mediation of the link L and sleeve K, will move the clutch M and its shaft G longitudinally, so as to free the grain-wheel, allowing it to revolve at a slower velocity than before, and therefore offer no obstruction to the quick and free turning of the machine. If the machine be backed upon D as a pivot, then the backward rotation of the shaft G has no effect upon the grain-wheel, and it remains stationary.

In place of using a clutch, M N, operated by the swinging of the machine-frame, it may be operated by a lever, $b$, and the pivoted pole B, as illustrated in Fig. 7, as in this case the lateral movement of the pole in turning will throw the clutch out of gear; but I prefer the construction first described. The device last described is substantially illustrated in Fig. 8 as applied to a grain-drill or fertilizer in which the clutch M N is adapted to be operated by shifting of the pivot-pole in turning in either direction to free two wheels, C and D, which are secured, respectively, to two parts of the divided shaft G, on the adjacent ends of which are located the parts N and M of the clutch. The construction is simple and easily understood at a glance at the figure. In this device the gears F, $f$, and H would be dispensed with.

I do not limit myself to any particular form of clutch nor to the method of attachment of the grain-wheel to the shaft G. Neither do I limit myself to the particular methods shown for connecting and disconnecting the supporting-wheels, as the invention comprehends a machine in which its frame or pole, or an attachment thereto, is caused by the action of the horse in turning the machine to disconnect the said supporting-wheels to enable them to run at different surface velocities. It is also evident that in place of making this disconnected mechanism automatic the clutch might be operated by the driver through the mediation of the lever or its equivalent by simply disconnecting it from the pole, as indicated in dotted lines, Figs. 7 and 8.

Having now described my invention, what I claim as new, and desire to secure by Letters Patent, is—

1. In a vehicle, the combination of the pole, two supporting-wheels for the vehicle geared together, a clutch for connecting and disconnecting the two wheels with respect to each other, and a mechanical connection between the pole and clutch, whereby the shifting of the latter is caused by lateral pressure upon the pole.

2. A vehicle-frame and two supporting-wheels, in combination with separate shafts for said wheels, gearing connecting said shafts, and a clutch to connect or disconnect one of said wheels with its shaft, a pole for the vehicle, and a connection between the pole and the clutch, whereby upon turning the vehicle the clutch is actuated to disconnect the outer wheel.

3. A vehicle-frame and two supporting-wheels of different diameters, in combination with a pole close to the larger wheel, shafts for said wheels, and gearing connecting the shafts and a grain-platform between said supporting-wheels, substantially as and for the purpose specified.

4. A vehicle-frame and two supporting-wheels of different diameters, in combination with two parallel shafts for said wheels and gearing connecting the shafts, the larger wheel being fixed to its shaft, and a clutch between the smaller of said wheels and its shaft for connecting or disconnecting that wheel with its shaft.

5. A vehicle-frame, a pole attached thereto near one wheel, and two supporting-wheels, in combination with supporting-shafts and a ratchet-clutch connecting one of said wheels with its shaft, whereby the wheel farthest from the pole is free to rotate faster than the wheel next to the pole, but not slower, substantially as and for the purpose specified.

6. In a vehicle, the combination of two supporting-wheels of different diameters, a pole attached to the frame near one wheel, separate shafts upon which the wheels are mounted, the wheel near the pole being fixed to its shaft, gearing connecting the shafts, and a ratchet-clutch connecting the other wheel to its shaft, whereby the wheel farthest from the pole is free to rotate faster than the wheel next to the pole, but not slower.

7. The combination of frame A, master-wheel C and its gear E, intermediate spur-wheel, $f$, shaft G, having pinion H and clutch-head M, fixed bearing $g$ and loose bearing I for said shaft, grain-wheel D, having spring-clutch N and loosely supported on shaft G, and link L, connected to the frame and shaft G, substantially as and for the purpose specified.

8. In a harvester, the combination of the frame, the main and grain wheels, of different diameters, mounted on separate axles, a pole attached to the frame near the main wheel, gearing connecting the main wheel with the grain-wheel, and a clutch connecting the grain-wheel with its immediate driver, whereby the grain-wheel is driven from the main wheel and is at the same time free to rotate faster but not slower than the main wheel.

In testimony of which invention I hereunto set my hand.

EDWARD W. JENKINS.

Witnesses:
R. M. HUNTER,
RICHD. S. CHILD, Jr.